United States Patent
Hakata et al.

(10) Patent No.: US 6,465,390 B1
(45) Date of Patent: Oct. 15, 2002

(54) POROUS COMPOSITE PARTICLES AND PROCESS FOR PRODUCING THE SAME

(75) Inventors: Toshiyuki Hakata, Hiroshima (JP); Tomoko Okita, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/685,225

(22) Filed: Oct. 12, 2000

(30) Foreign Application Priority Data

Oct. 14, 1999 (JP) .......................................... 11-292022

(51) Int. Cl.$^7$ ............................ B01J 21/18; B01J 23/02; C04B 35/00; C04B 35/26; B32B 15/02
(52) U.S. Cl. ...................... 502/182; 502/183; 502/185; 252/62.51 R; 252/62.56; 252/62.61; 252/62.62; 252/62.63; 428/402; 428/407; 428/694 XS
(58) Field of Search .................................. 502/182, 183, 502/185; 252/62.51 R, 62.56, 62.61–62.63; 428/402, 407, 694 XS

(56) References Cited

U.S. PATENT DOCUMENTS

| 4,471,072 A | 9/1984 | Leyerle et al. | 502/413 |
| 5,053,574 A | 10/1991 | Tsutsui et al. | 585/488 |
| 5,108,862 A * | 4/1992 | Kishimoto et al. | 430/108 |
| 5,731,085 A * | 3/1998 | Hakata et al. | 428/402 |
| 6,228,924 B1 * | 5/2001 | Matsui et al. | 524/430 |

FOREIGN PATENT DOCUMENTS

| EP | 0607636 | 12/1993 |
| EP | 0681868 | 5/1995 |
| WO | WO 99/22862 | 5/1999 |

OTHER PUBLICATIONS

European Search Report Feb. 22, 2001.

* cited by examiner

Primary Examiner—Mark L. Bell
Assistant Examiner—Patricia L. Hailey
(74) Attorney, Agent, or Firm—Nixon & Vanderhye P.C.

(57) ABSTRACT

Porous composite particles contain 80 to 98% by weight of a filling material and 2 to 20% by weight of carbon, and have an average pore diameter of not more than 5 nm when measured with respect to pores existing in both the surface and inside portions thereof, an average particle size of 1 to 1,000 μm and a specific surface area of 45 to 200 m$^2$/g. These porous composite particles individually contain the filling material in as large an amount as possible, so they have not only a high catalytic but also a high adsorption ability, thereby exhibiting an excellent catalytic activity.

14 Claims, No Drawings

POROUS COMPOSITE PARTICLES AND PROCESS FOR PRODUCING THE SAME

BACKGROUND OF THE INVENTION

The present invention relates to porous composite particles and a process for producing the porous composite particles, and more particularly, to porous functional composite particles having not only a high catalytic by incorporating therein a large amount of a functional filling material having various catalytic property, but also a high adsorption ability to malodorous substances and harmful substances by uniformly distributing fine pores having an average pore diameter of especially not more than 5 nm in the surface and inside portions thereof, thereby exhibiting an excellent catalytic activity, and a process for producing such porous functional composite particles.

Hitherto, various studies have been made to solve problems of environmental pollution by chemical substances. In particular, in recent years, dioxins contained in an exhaust gas discharged upon incineration of combustible wastes cause significant social problems.

Also, with the recent tendency toward comfortableness, safety, hygiene and ecology, so-called amenity catalysts for living equipment or household appliances such as deodorization catalysts, water-treatment catalysts and combustion catalysts have been favorably used in ordinary amenity spaces. For this reason, it has been strongly required to provide catalysts for these purposes capable of exhibiting an excellent catalytic activity.

In order to remove malodorous substances or harmful substances in air, there have been used (1) a method of absorbing these substances into acid or alkali solutions; (2) a method of oxidizing these substances by using an oxidizing agent such as potassium permanganate and ozone, or by combusting at a high temperature; (3) a method of absorbing or adsorbing these substances into an adsorbent such as activated carbon and zeolite; or the like.

However, the method (1) cannot exhibit a sufficient removal effect, and rather tends to cause additional problems such as treatment or disposal of the resultant waste liquid containing the harmful substances or the like. In the method (2), the waste gas produced after the oxidation treatment must be post-treated to remove chlorine or ozone contained therein. Further, in the case where the high-temperature combustion is conducted, increased costs are required therefor. In the method (3), the absorbent used therein exhibits only a limited absorption capacity, thereby requiring complicated regeneration or replacement operations.

In order to solve these problems, there have been conventionally proposed various methods for improving the catalytic activity of catalysts used. For example, there are known a method of using a fluidized bed catalyst comprising a porous catalyst carrier having a surface area of 1 to 350 $m^2/g$ and a pore volume of 0.4 to 3.0 cc/g such as silica, alumina or zirconia, and a catalyst component such as iron, cobalt or nickel which is carried on a pore surface of the carrier in an amount equivalent to one atom layer (Japanese Patent Application Laid-Open (KOKAI) No. 58-109138 (1983)); a method of using a carbon monoxide conversion catalyst formed by carrying a catalyst component containing chromium as a main component on porous heat-resistant zeolite (Japanese Patent Application Laid-Open (KOKAI) No. 61-8138(1986)); a method of using a mixture of activated carbon as an absorbent and calcium oxide, iron oxide, manganese oxide, aluminum oxide or the like as a promoter for decomposition of pollutants (Japanese Patent Application Laid-Open (KOKAI) No. 4-110035(1992)); or the like.

Also, there are known spherical composite particles composed of magnetic particles and carbon (Japanese Patent Application Laid-Open (KOKAI) No. 6-231931(1994)).

At present, it has been strongly required to provide catalysts capable of exhibiting an excellent catalytic activity. However, such catalysts fulfilling the above requirements have not been provided yet.

Specifically, in the method described in Japanese Patent Application Laid-Open (KOKAI) No. 58-109138(1983), the catalyst is carried on the pore surface of the carrier only in such a small amount corresponding to five atom layers at most, i.e., the amount of the catalyst itself carried thereon is insufficient, thereby failing to exhibit a sufficient removal effect.

In the method described in Japanese Patent Application Laid-Open (KOKAI) No. 61-8138(1986), the amount of the catalyst carried is also as small as 2 to 20 parts by weight based 100 parts by weight of the carrier, thereby failing to obtain a sufficient removal effect. Further, the porous carrier used therein is in the form of a honeycomb-like or hollow-cylindrical molded product and, therefore, can be used only in limited applications.

In addition, in the method described in Japanese Patent Application Laid-Open (KOKAI) No. 4-110035(1992), since the individual particles cannot exhibit both of adsorption property and catalytic, it is difficult to effectively adsorb and decompose pollutants and harmful substances.

In the method described in Japanese Patent Application Laid-Open (KOKAI) No. 6-231931(1994), the spherical composite particles used therein are so designed as to achieve a dense structure composed of magnetic particles and carbon in order to keep the strength of the composite particles and, therefore, do not have a porous structure having pores therein.

As a result of the present inventors' earnest studies for solving the above problems, it has been found that by polymerizing phenols with aldehydes in an aqueous medium in the presence of a filling material to produce granulated composite particles containing a phenol resin as a binder; subjecting the reaction mixture to solid-liquid separation to separate the obtained granulated composite particles therefrom; and heat-treating the composite particles at a temperature of 400 to 800° C. in an inert atmosphere to carbonize the phenol resin, the obtained porous composite particles have not only a high catalytic (ability as catalyst) but also a high adsorption ability, thereby exhibiting an excellent catalytic activity. The present invention has been attained based on the finding.

SUMMARY OF THE INVENTION

It is an object of the present invention to provide porous composite particles having not only a high catalytic but also a high adsorption property, thereby exhibiting an excellent catalytic activity.

It is another object of the present invention to provide a process for producing porous composite particles having not only a high catalytic but also a high adsorption property.

To accomplish the aims, in a first aspect of the present invention, there are provided porous composite particles comprising 80 to 98% by weight of a filling material and 2 to 20% by weight of carbon, and having an average pore diameter of not more than 5 nm when measured with respect to pores existing in both the surface and inside portions of the particles, an average particle size of 1 to 1,000 μm and a specific surface area of 45 to 200 $m^2/g$.

In a second aspect of the present invention, there is provided a process for producing porous composite particles which comprises the steps of polymerizing phenols with aldehydes in an aqueous medium in the presence of a filling material using a basic catalyst as an initiator to produce granulated composite particles containing a phenol resin as a binder; subjecting the reaction mixture to solid-liquid separation to separate said granulated composite particles therefrom; drying the obtained granulated composite particles to obtain dried composite particles containing a water-soluble phenol resin-forming component in an amount of 0.6 to 5 mg/liter when measured according to the test method for utensils and toys 3,1,5,3 defined in the Japanese Food Sanitation Law; and heat-treating the dried composite particles at a temperature of 400 to 800° C. in an inert atmosphere to carbonize the phenol resin.

DETAILED DESCRIPTION OF THE INVENTION

The present invention will be described in detail below.

First, the porous composite particles according to the present invention is described.

The porous composite particles of the present invention are particles comprising a filling material and carbon.

The filling material used in the present invention is composed of inorganic compound particles having various catalyst properties which are insoluble in water or undergo neither deterioration nor modification when exposed to water. Examples of the filling materials may include metal oxide particles such as iron-based oxide particles, titanium oxide particles, calcium oxide particles, silicon oxide particles, manganese oxide particles and aluminum oxide particles; various metal particles such as iron, nickel and magnesium; or the like. Specific examples of the iron-based oxide particles may include iron oxide particles such as hematite particles, magnetite particles and maghemite particles; particles formed by coating with or incorporating an element other than iron such as cobalt or the like onto or into the iron oxide particles; magnetoplumbite-type ferrite particles containing barium and/or strontium; spinel-type ferrite particles containing at least one metal selected from the group consisting of manganese, nickel, zinc, lithium and magnesium; or the like.

The amount of the filling material used is usually 80 to 98% by weight based on the weight of the porous composite particles. When the amount of the filling material used is less than 80% by weight, the amount of the filling material contained in the porous composite particles may become insufficient, thereby failing to obtain a sufficient catalytic. When the amount of the filling material used is more than 98% by weight, the obtained porous composite particles may be deteriorated in strength. In the consideration of both the catalytic and strength, the amount of the filling material used is preferably 80 to 95% by weight, more preferably 80 to 92% by weight based on the weight of the porous composite particles.

The amount of carbon used is usually 2 to 20% by weight based on the weight of the porous composite particles. When the amount of the carbon used is less than 2% by weight, the obtained porous composite particles may be insufficient in adsorption ability and strength. When the amount of the carbon used is more than 20% by weight, the amount of the filling material may become comparatively small, resulting in insufficient catalytic of the obtained porous composite particles. In the consideration of both the catalytic and strength, the amount of the carbon used is preferably 5 to 20% by weight, more preferably 8 to 20% by weight based on the weight of the porous composite particles.

The porous composite particles of the present invention have an average pore diameter of usually not more than 5 nm when measured with respect to pores existing in both the surface and the inside portions of the composite particles. When the average pore diameter is more than 5 nm, it may become difficult to selectively adsorb aimed substances, thereby failing to exhibit an excellent catalytic activity. The lower limit of the average pore diameter is 1 nm. In the consideration of the size of the substances to be adsorbed thereinto, the average pore diameter of the porous composite particles is preferably 1 to 4 nm, more preferably 1 to 3 nm.

The porous composite particles of the present invention have an average particle size of usually 1 to 1,000 μm, preferably 1 to 300 μm, more preferably 1 to 150 μm. When the average particle size is less than 1 μm, the porous composite particles may tend to suffer from secondary aggregation, so that the amount of the composite particles filled into a catalyst-packed tower may become insufficient. When the average particle size is more than 1,000 μm, the obtained porous composite particles may be deteriorated in mechanical strength. Such large composite particles having a deteriorated mechanical strength may tend to be sometimes damaged or broken when filled into a catalyst-packed tower.

The porous composite particles of the present invention have a BET specific surface area of usually 45 to 200 m$^2$/g. Here, the BET specific surface area represents a sum of a whole outer surface area and a whole pore surface area of the particles. When the BET specific surface area of the composite particles is less than 45 m$^2$/g, the whole pore surface area thereof may become too small so that the pore volume thereof also may become insufficient, resulting in deterioration in adsorption property. When the BET specific surface area is more than 200 m$^2$/g, it may be difficult to selectively adsorb the aimed substances. In order to obtain an effective catalytic activity, the BET specific surface area of the porous composite particles is preferably 47 to 180 m$^2$/g, more preferably 50 to 150 m$^2$/g.

The porous composite particles of the present invention have a micropore surface area of usually 45 to 198 m$^2$/g. Here, the micropore surface area represents a total of pore surface areas except for an outer surface area of the particles. When the micropore surface area of the composite particles is less than 45 m$^2$/g, the pore volume thereof may become insufficient, resulting in deterioration in adsorption property. When the micropore surface area is more than 198 m$^2$/g, it may be difficult to selectively adsorb the aimed substances. In order to obtain an effective catalytic activity, the micropore surface area of the porous composite particles is preferably 47 to 180 m$^2$/g, more preferably 49 to 150 m$^2$/g.

The porous composite particles of the present invention have a pore volume of usually 0.02 to 0.1 cc/g. When the pore volume of the porous composite particles is less than 0.02 cc/g, the adsorption property thereof may tend to be deteriorated. When the pore volume of the porous composite particles is more than 0.1 cc/g, it may be difficult to selectively adsorb the aimed substances. In the consideration of obtaining an effective catalytic activity, the pore volume of the porous composite particles is preferably 0.03 to 0.08 cc/g.

The porous composite particles of the present invention may have an elliptical or spherical shape and, therefore, can exhibit a high packing percentage and a high flowability. This facilitates the filling of the composite particles into a catalyst-packed tower. In the consideration of the filling property of the composite particles into the catalyst-packed tower, the use of spherical particles having a sphericity of usually 1.0 to 1.25 is preferred.

The porous composite particles of the present invention may have a methylene blue adsorption of usually not less than 70%, preferably not less than 75%. The upper limit of the methylene blue adsorption is 100%.

The porous composite particles of the present invention have a monochlorobenzene dechlorination percentage of usually not less than 70%, preferably not less than 75%, more preferably not less than 80%. The upper limit of the monochlorobenzene dechlorination percentage is 100%.

Next, the process for producing the porous composite particles according to the present invention is described.

The porous composite particles of the present invention can be produced by polymerizing phenol with formalin in an aqueous medium in the presence of a filling material to produce granulated composite particles comprising, as a binder, a phenol resin containing a water-soluble phenol resin-forming component; drying the obtained granulated composite particles to adjust the content of the water-soluble phenol resin-forming component to a specific range; and heat-treating the dried composite particles in an inert atmosphere to carbonize the phenol resin.

In the process of the present invention, as the filling material, in addition to the above-described inorganic compound particles, there may also be used metal oxide hydroxide particles capable of being converted into the inorganic compound particles when heated at a temperature of not less than 500° C., such as iron oxide hydroxide particles, e.g., goethite particles, akaganeite particles, lepidocrocite particles or the like.

The filling material may have any suitable shape such as a cubic shape, a polyhedral shape, a spherical shape, an acicular shape, a plate-like shape or the like. The filling material may have an average particle size smaller than that of the composite particles, usually 0.01 to 5.0 μm, preferably 0.1 to 2.0 μm. These filling materials may be used alone or in the form of a mixture of any two or more thereof.

The filling material used in the present invention may be preliminarily subjected to lipophilic treatment, if required. When such a lipophilic-treated filling material is used, it is possible to increase the amount of the filling material contained in the granulated composite particles, so that the obtained granulated composite particles tend to have a spherical shape.

The lipophilic treatment may be conducted by the method of treating the filling material with a coupling agent such as silane-based coupling agents and titanate-based coupling agents; or the method of dispersing the filling material in an aqueous medium containing a surfactant so as to adsorb the surfactant onto the surfaces of the particles.

As the silane-based coupling agents, there may be used those having hydrophobic groups, epoxy groups or amino groups. Examples of the silane-based coupling agents having hydrophobic groups may include vinyl trichlorosilane, vinyl triethoxysilane, vinyl tris(β-methoxy)silane or the like. As the titanate-based coupling agents, there may be used isopropyl triisostearoyl titanate, isopropyl tridodecylbenzenesulfonyl titanate, isopropyl tris(dioctylpyrophosphate) titanate or the like.

Examples of the silane-based coupling agents having epoxy groups may include γ-glycidoxypropylmethyl dimethoxysilane, γ-glycidoxypropyl trimethoxysilane, β-(3, 4-epoxycyclohexyl)trimethoxysilane or the like.

Examples of the silane-based coupling agents having amino groups may include γ-aminopropyl trimethoxysilane, N-β-(aminoethyl)-γ-aminopropyl trimethoxysilane, N-β-(aminoethyl)-γ-aminopropylmethyl dimethoxysilane, N-phenyl-γ-aminopropyl trimethoxysilane or the like.

As the surfactants, there may be used commercially available surfactants, preferably those having functional groups capable of bonding with the filling material or hydroxyl groups existing on the surface thereof. As to the ionicity of the surfactants, the use of cationic or anionic surfactants is preferred.

The lipophilic treatment for the filling material may be conducted by any of the above-described methods. However, in the consideration of adhesion property to the phenol resin, the treatment is preferably conducted using silane-based coupling agents having amino and/or epoxy groups.

The amount of the lipophilic agent used is usually not more than 5.0% by weight, preferably 0.1 to 5.0% by weight based on the weight of the filling material. When the amount of the lipophilic agent is less than 0.1% by weight, it may be difficult to obtain the effect of increasing the amount of the filling material contained in the granulated composite particles. When the amount of the lipophilic agent is more than 5.0% by weight, an excessive amount of the lipophilic agent remains on the surfaces of the granulated composite particles, so that the composite particles may tend to be adhered to each other and agglomerated together via the lipophilic agent. As a result, it may be difficult to control the particle size of the granulated composite particles.

The granulated composite particles may be produced by polymerizing phenols with aldehydes in an aqueous medium in the presence of the filling material using a basic catalyst as an initiator.

As the phenols, in addition to phenol, there may be used compounds having phenolic hydroxyl groups, e.g., alkyl phenols such as m-cresol, p-tert-butyl phenol, o-propyl phenol, resorcinol and bisphenol A; halogenated phenols formed by substituting a part or whole of hydrogen atoms bonded to benzene ring or alkyl groups of the phenols, with chlorine or bromine; or the like. In the case where the compounds other than phenol is used, particles may be difficult to produce, or even if particles are produced, the obtained particles may tend to have an amorphous shape. Therefore, in the consideration of the particle shape, the use of phenol is preferred.

As the aldehydes, there may be used formaldehyde in the form of either formalin or paraformaldehyde, furfural or the like. Among these aldehydes, formaldehyde is preferred.

The molar ratio of the aldehydes to the phenols is preferably 1:1 to 4:1, more preferably 1.2:1 to 3:1. When the molar ratio of the aldehydes to the phenols is less than 1:1, it may tend to be difficult to produce the granulated composite particles, or even if the particles are produced, there may be such a tendency that the obtained granulated composite particles have a low strength since the curing of resins is difficult to proceed. When the molar ratio of the aldehydes to the phenols is more than 4:1, an increased amount of unreacted aldehydes may tend to still remain in the aqueous medium after the reaction.

As the basic catalysts, there may be used those used for the production of ordinary resol resins. Examples of the basic catalysts may include aqueous ammonia or alkyl amines such as hexamethylene tetramine, dimethyl amine, diethyl triamine, polyethylene imine or the like. The molar ratio of the basic catalyst to the phenols is usually 0.02:1 to 0.7:1.

In the present invention, the granulated composite particles may be produced in the form of a water dispersion by conducting the reaction between the phenols and the aldehydes at a temperature of usually 70 to 90° C. simultaneously with the curing reaction, and then cooling the obtained particles to a temperature of not more than 40° C.

Then, the water dispersion (reaction mixture) containing the granulated composite particles is subjected to solid-liquid separation by ordinary methods such as filtration and centrifugal separation. Thereafter, the thus separated particles are dried to obtain dried granulated composite particles.

Upon drying the granulated composite particles, it is essential to control the drying conditions such that an appropriate amount of a water-soluble phenol resin-forming component such as phenols, aldehydes and oligomers having some degree of polymerization, still remain in the dried particles.

In order to control the amount of the water-soluble phenol resin-forming component contained in the dried composite particles to a specific range, the water-washing of the particles obtained by the solid-liquid separation should be avoided. That is, in order to control the amount of the water-soluble phenol resin-forming component contained in the dried composite particles to a specific range, the particles is dried under moderate conditions so as to remove only water therefrom, for example, at a temperature as low as 50 to 100° C. under atmospheric pressure. The amount of the water-soluble phenol resin-forming component contained in the dried composite particles is usually 0.6 to 5 mg/liter, preferably 0.6 to 3 mg/liter, more preferably 0.7 to 2 mg/liter, when measured according to the test method for utensils or toys 3,1,5,3 defined in Japanese Food Sanitation Law.

When the amount of the water-soluble phenol resin-forming component is less than 0.6 mg/liter, the obtained composite particles may not have a sufficient amount of pores in the surface and inside portions thereof. When the amount of the water-soluble phenol resin-forming component is more than 5 mg/liter, the particles may tend to be agglomerated together upon the subsequent heat-treatment for carbonizing the phenol resin.

In the present invention, the polymerization reaction may be conducted in the presence of a suspension stabilizer, if required. The presence of the suspension stabilizer facilitates the production of the granulated composite particles.

Examples of the suspension stabilizers may include hydrophilic organic compounds such as carboxymethyl cellulose and polyvinyl alcohol; fluorine compounds such as calcium fluoride; water-insoluble inorganic salts such as calcium sulfate; or the like.

In the process of the present invention, the dried composite particles may be then heat-treated to decompose and carbonize the phenol resin at a temperature of usually not less than 400° C., preferably 500 to 800° C. in an inert atmosphere.

When the heat-treating temperature is less than 400° C., the carbonization of the phenol resin may require a long period of time. For example, in the case where magnetite is used as the filling material, the magnetite particles tend to be partially or entirely reduced into readily-oxidizable iron or wustite by the resins when the heat-treatment is conducted at a too high temperature. For this reason, in case of the magnetite particles, the heat-treatment is preferably conducted at a temperature of not more than 800° C.

As the heat-treating furnace for the above heat-treatment, there may be used any suitable furnaces such as fixed-type ones or rotary-type ones. Among these heat-treating furnaces, the use of rotary-type heat-treating furnaces is preferred.

The inert atmosphere may be produced by flowing an inert gas such as helium, argon and nitrogen through the heat-treating furnace. Among these inert gases, the nitrogen gas is sufficient in view of costs. Incidentally, when the heat-treatment is conducted in an oxidation atmosphere, e.g., in air, the carbon is reacted with oxygen to produce carbon dioxide so that the actual carbon ratio (amount of residual carbon contained in the composite particles; hereinafter referred to merely as "actual carbon ratio".) are lowered, thereby failing to accomplish the aims of the present invention.

The flow rate of the inert gas varies depending upon scale or size of the heat-treating furnace used. Even when using readily-oxidizable filling materials such as metal iron or magnetite, the oxidation problem can be sufficiently avoided by flowing the inert gas at a flow rate of usually not less than one liter/min., preferably 2 to 8 liters/min.

The heat-treating time varies depending upon the heat-treating temperature used, and is usually 1 to 3 hours.

The important point of the present invention lies in the fact that by polymerizing phenols with aldehydes in an aqueous medium in the presence of the filling material using a basic catalyst as an initiator; drying the resultant particles to obtain dried composite particles containing a phenol resin as a binder resin, to adjust the amount of a water-soluble phenol resin-forming component contained in the dried composite particles to a specific range; and heat-treating the obtained dried composite particles at a temperature of not less than 400° C. in an inert atmosphere to carbonize the phenol resin, there can be obtained porous composite particles having an average pore diameter of not more than 5 nm, when measured with respect to pores existing in both the surface and inside portions thereof.

The reason why the porous composite particles of the present invention have fine pores, is considered as follow. That is, the phenol resin contained in the dried composite particles has a high actual carbon ratio, and the water-soluble phenol resin-forming component contained in the dried composite particles in an adequate amount can be removed by the subsequent heat-treatment.

The reason why the porous composite particles of the present invention have pores having uniform pore diameters, is considered by the present inventors as follows. That is, in the granulated composite particles obtained from the aqueous solution by the polymerization reaction, the filling material and the phenol resin are uniformly dispersed therein, so that the water-soluble phenol resin-forming component is also uniformly contained in the composite particles.

The reason why the porous composite particles of the present invention exhibit a high strength, is considered as follows. That is, the filling materials are uniformly and firmly bonded together via the phenol resin, thereby producing granulated composite particles having a closely packed structure. Since such granulated composite particles are used as raw particles to be heat-treated, the obtained porous composite particles can also have a closely packed structure, resulting in a high strength thereof.

The porous composite particles according to the present invention contain a large amount of the filling material having various catalyst property and, therefore, can exhibit a high catalytic. In addition, the porous composite particles according to the present invention contain fine pores in the surfaces and inside portions thereof, thereby exhibiting a high adsorption ability. Therefore, the porous composite particles of the present invention are suitably used as porous composite particles for catalysts.

In the case where the porous composite particles of the present invention are used as various catalysts, since a large amount of the filling material having a good catalytic is contained therein and since pores having uniform diameters are formed therein, it is expected that the porous composite particles can exhibit an excellent catalytic activity, for example, when used as adsorbents or catalysts for effectively removing chlorine contained in liquefied decomposition oils obtained by thermal decomposition of waste plastics, or chlorine contained in water.

EXAMPLES

The present invention is described in more detail by Examples and Comparative Examples, but the Examples are only illustrative and, therefore, not intended to limit the scope of the present invention.

Various properties were measured by the following methods.

(1) The average particle size of the particles obtained in the following Examples and Comparative Examples is expressed by the value measured by a laser diffraction-type particle size distribution meter (manufactured by Horiba Seisakusho Co., Ltd.). The shape or configuration of the particles is observed by a scanning electron microscope ("S-800" manufactured by Hitachi Limited).

(2) The amount of the water-soluble phenol resin-forming component contained in the dried granulated particles is expressed by the value obtained by measuring the amount of a water-soluble phenol resin-forming component eluted according to the test method for utensils and toys 3,1,5,3 defined in the Japanese Food Sanitation Law, by a quantitative determination method using 4-aminoantipyrine as specified in the test method. More specifically, 10 g of the dried composite particles were dispersed in 100 cc of distilled water. The obtained dispersion was heat-treated at 60° C. for 30 minutes to elute out the water-soluble phenol resin-forming component from the particles. Then, the dispersion was subjected to solid-liquid separation to remove the composite particles therefrom. The thus obtained elution solution was measured by a calorimetric method using 4-aminoantipyrine to determine an amount of phenol extracted as the amount of the water-soluble phenol resin-forming component.

(3) The sphericity is measured using a scanning electron microscope ("S-800" manufactured by Hitachi Limited) by the following method. That is, not less than 250 particles were randomly extracted, and then the average maximum diameter (l) and the average minimum diameter (w) thereof were respectively measured. The sphericity of the particles are calculated from the measured values according to the following formula:

Sphericity=$l/w$ wherein l represents an average maximum diameter of the particles; and w represents an average minimum diameter of the particles.

(4) The BET specific surface area and micropore surface area of the particles are respectively expressed by the values measured by NOVA 1200 (manufactured by Quantachrome Corp.).

(5) The average pore diameter of the particles is expressed by the value measured by NOVA 1200 (manufactured by Quantachrome Corp.).

(6) The pore volume of the particles is expressed by the value measured by NOVA 1200 (manufactured by Quantachrome Corp.).

(7) The adsorption property of the particles is expressed by the value of the methylene blue adsorption measured by the following method.

0.1 g of the particles were added to 100 cc of an aqueous methylene blue solution (6.765 mg/liter), and the obtained dispersion was shaken by hand. Thereafter, the dispersion was allowed to stand for 72 hours, and then subjected to solid-liquid separation by filtering out the particles therefrom. The resultant filtrate was subjected to the measurement of absorbance at 665 nm. The methylene blue adsorption of the particles was calculated from the difference between the concentrations of the methylene blue solution before and after adding the particles thereto. Incidentally, the measurement of the absorbance was conducted by UV2400PC (manufactured by Shimadzu Co., Ltd.).

(8) The catalytic activity of the particles is expressed by the monochlorobenzene dechlorination percentage measured by the following method.

50 mg of each sample was packed in a glass column, and the temperature of the sample was adjusted to 350° C. 0.05 $\mu l$ of monochlorobenzene was poured into the column through a microsyringe. The gas passed through the column was measured using a Gas Chromatography-Mass Spectroscopy GCMS-QP5050 (manufactured by Shimadzu Seisakusho Co., Ltd.), thereby determining the amounts of unreacted monochlorobenzene and benzene obtained by the dechlorination of monochlorobenzene according to the separately prepared calibration curve.

Example 1

<Production of Dried Composite Particles>

One kilogram of spherical magnetite particles having an average particle size of 0.24 $\mu m$ were charged into a Henschel mixer. Then, while vigorously stirring the magnetite particles, 5.0 g of an epoxy-containing silane-based coupling agent "KBM-403" (tradename, produced by Shinetsu Kagaku Kogyo Co., Ltd.) was added thereto, thereby treating the surfaces of the magnetite particles with the epoxy-containing silane-based coupling agent.

Separately, 125 g of phenol, 187.5 g of 37% formalin, 1 kg of the magnetite particles surface-treated with the epoxy-containing silane-based coupling agent, 37.5 g of 25% aqueous ammonia and 125 g of water were charged into one-liter flask. The resultant mixture was heated to 85° C. for 60 minutes while stirring, and then reacted and cured at that temperature for 120 minutes, thereby producing granulated composite particles comprising a phenol resin and magnetite particles.

Next, after the contents of the flask were cooled to 30° C., the supernatant was removed therefrom, and then the precipitated granulated composite particles as a lower layer were filtered out. Thereafter, the separated granulated composite particles were dried by a draft drier at 80 for 7 hours, thereby obtaining dried composite particles (A).

The thus obtained dried composite particles (A) were spherical composite particles having an average particle size of 72 $\mu m$ (sphericity: 1.1) and containing 88.6% by weight of magnetite particles and 11.4% by weight of a phenol resin. Further, the composite particles (A) contained a water-soluble phenol resin-forming component in an amount of 1.2 mg/liter.

<Heat-treatment of Dried Composite Particles>

The above obtained dried composite particles were charged into a 10-liter rotary heat-treating furnace, and while flowing a nitrogen gas through the heat-treating furnace at a flow rate of one liter/min., the inside temperature of the furnace was increased to 600° C. at which the particles were then treated for one hour. The thus treated particles were cooled to room temperature and then taken out from the furnace. The obtained heat-treated product was spherical composite particles having an average particle size of 72 μm (sphericity: 1.1) and containing 92.8% by weight of magnetite particles and 7.2% by weight of carbon. In addition, the obtained particles were porous composite particles having an average pore diameter of 2.5 nm, a BET specific surface area of 62 m²/g, a micropore surface area of 59 m²/g and a pore volume of 0.05 cc/g. Further, the porous composite particles had a methylene blue adsorption of 91%. Therefore, it was confirmed that the porous composite particles had a number of pores in the surface and inside portions thereof and exhibited an excellent adsorption property. Furthermore, the porous composite particles had a monochlorobenzene dechlorination percentage of 99%. Therefore, it was confirmed that the porous composite particles exhibited an excellent catalytic activity.

Examples 2 to 6 and Comparative Example 1

The same procedure as defined in Example 1 was conducted except that kind of filling material, use or non-use of lipophilic agent, kind and amount of lipophilic agent, amount of basic catalyst, amount of phenol, amount of formalin, amount of water and drying conditions were changed variously, thereby obtaining dried composite particles (B) to (G). Main production conditions and various properties of the obtained dried composite particles are shown in Table 1.

Meanwhile, in Example 6, the polymerization reaction was conducted in the presence of 2.5 g of calcium fluoride as a suspension stabilizer.

In Table 1, the lipophilic agents used in Examples 2 to 4 and Comparative Example 1 were N-β-(aminoethyl)-γ-aminopropylmethyldimethoxysilane (tradename: "KBM602", produced by Shinetsu Kagaku Kogyo Co., Ltd.), γ-glycidoxypropyl-dimethoxysilane (tradename: "KBM403", produced by Shinetsu Kagaku Kogyo Co., Ltd.), isopropyltriisostearoyl-titanate (tradename: "PRENEACT TTS", produced by Ajinomoto Co., Ltd.) and γ-glycidoxymethyldiethoxysilane (tradename: "KBM402", produced by Shinetsu Kagaku Kogyo Co., Ltd.), respectively.

Meanwhile, in Comparative Example 1, granulated composite particles produced by the same method as defined in Example 1 were separated by the solid-liquid separation of reaction mixture, washed with water and then dried at 180° C. under reduced pressure (not more than 5 cmHg), thereby obtaining the dried composite particles.

Examples 7 to 11 and Comparative Examples 2

The same procedure as defined in Example 1 was conducted except that kind of dried composite particles and heating temperature used in the heat-treatment step were changed variously, thereby porous composite particles (II) to (VII).

Main production conditions and various properties of the obtained porous composite particles are shown in Table 2.

Comparative Example 3

One kilogram of magnetite particles having an average particle size of 0.24 μm were charged into a Henschel mixer, and then vigorously stirred. Thereafter, a solution prepared by dissolving 110 g of a commercially available phenol resin "BELPEARL S890" (tradename; produced by Kanebo Co., Ltd.) in ethanol, was added to the magnetite particles and mixed therewith, thereby obtaining composite particles composed of magnetite and the phenol resin. The thus obtained composite particles were compression-molded under a pressure of 80 Kg/cm² using a compression-molding machine ("ROLLER-COMPACTOR", manufactured by Turbo Kogyo Co., Ltd.), thereby obtaining granulated molded particles (H).

The thus obtained granulated molded particles (H) were heat-treated by the same method as defined in Example 1 and then pulverized, thereby obtaining heat-treated pulverized particles (VIII). The obtained heat-treated pulverized particles were amorphous particles having a particle size distribution as wide as 10 to 200 μm.

Main production conditions and various properties of the obtained particles are shown in Table 2.

TABLE 1

| Examples and Comparative Examples | Production of granulated composite particles Filling material | | |
|---|---|---|---|
| | Kind | Average particle size (μm) | Amount (g) |
| Example 2 | Magnetite | 0.24 | 1,000 |
| Example 3 | Hematite | 0.2 | 1,000 |
| Example 4 | Plate-like barium ferrite | 0.6 | 1,000 |
| Example 5 | Titanium oxide | 0.1 | 1,000 |
| Example 6 | Magnetite | 0.24 | 1,000 |
| Comparative Example 1 | Magnetite | 0.24 | 1,000 |

| Examples and Comparative Examples | Production of granulated composite particles | | | |
|---|---|---|---|---|
| | Lipophilic treatment | | Basic catalyst | |
| | Kind | Amount (g) | Kind | Amount (g) |
| Example 2 | KBM602 | 0.5 | Aqueous ammonia | 30 |
| Example 3 | KBM403 | 1 | Aqueous ammonia | 35 |
| Example 4 | PRENEACT TTS | 0.5 | Aqueous ammonia | 25 |
| Example 5 | KBE403 | 3.0 | Aqueous ammonia | 40 |
| Example 6 | — | — | Aqueous ammonia | 20 |
| Comparative Example 1 | KBM402 | 0.7 | Aqueous ammonia | 30 |

| Examples and Comparative Examples | Production of granulated composite particles | | | | |
|---|---|---|---|---|---|
| | Amount of phenol (g) | Amount of formalin (g) | Amount of water (g) | Drying condition | |
| | | | | Temp. (° C.) | Time (hr.) |
| Example 2 | 100 | 150 | 100 | 80 | 7 |
| Example 3 | 110 | 160 | 120 | 80 | 7 |
| Example 4 | 100 | 140 | 100 | 80 | 7 |
| Example 5 | 120 | 200 | 300 | 80 | 7 |
| Example 6 | 110 | 160 | 150 | 80 | 7 |
| Comparative Example 1 | 100 | 150 | 100 | 180 | 5 (5 cmHg) |

TABLE 1-continued

Production of dried composite particles

| Examples and Comparative Examples | Average particle size (μm) | Shape | Amount of filling material (%) |
|---|---|---|---|
| Example 2 | 30 | Spherical | 85.5 |
| Example 3 | 22 | Spherical | 81.5 |
| Example 4 | 78 | Spherical | 88.7 |
| Example 5 | 12 | Spherical | 81.2 |
| Example 6 | 80 | Spherical | 92.0 |
| Comparative Example 1 | 72 | Spherical | 88.8 |

Production of dried composite particles

| Examples and Comparative Examples | Amount of water-soluble pheol resin-forming component (mg/liter) | Kind of particles |
|---|---|---|
| Example 2 | 1.0 | B |
| Example 3 | 1.2 | C |
| Example 4 | 0.8 | D |
| Example 5 | 1.3 | E |
| Example 6 | 1.7 | F |
| Comparative Example 1 | 0.2 | G |

TABLE 2

Heat-treatment conditions

| Examples and Comparative Examples | Dried composite particles | Temp. (° C.) | Time (hr.) | Flow rate of $N_2$ gas (liter/min.) |
|---|---|---|---|---|
| Example 7 | B | 550 | 2 | 1 |
| Example 8 | C | 550 | 2 | 1 |
| Example 9 | D | 680 | 2 | 1 |
| Example 10 | E | 600 | 2 | 1 |
| Example 11 | F | 500 | 2 | 1 |
| Comparative Example 2 | G | 550 | 2 | 1 |
| Comparative Example 3 | H | 600 | 2 | 1 |

Properties of functional particles

| Examples and Comparative Examples | Average particle size (μm) | Sphericity | Amount of filling material |
|---|---|---|---|
| Example 7 | 30 | 1.1 | 90.2 |
| Example 8 | 21 | 1.2 | 88.9 |
| Example 9 | 78 | 1.1 | 93.2 |
| Example 10 | 11 | 1.2 | 88.6 |
| Example 11 | 80 | 1.2 | 93.0 |
| Comparative Example 2 | 73 | 1.1 | 95.5 |
| Comparative Example 3 | — | — | 92.0 |

Properties of functional particles

| Examples and Comparative Examples | Content of activated carbon (%) | Average pore diameter (nm) | BET specific surface area ($m^2/g$) |
|---|---|---|---|
| Example 7 | 9.8 | 2.4 | 70 |
| Example 8 | 11.1 | 2.7 | 55 |
| Example 9 | 6.8 | 1.9 | 52 |
| Example 10 | 11.4 | 2.0 | 85 |
| Example 11 | 7.0 | 1.9 | 56 |
| Comparative Example 2 | 4.5 | 1.2 | 43 |
| Comparative Example 3 | 8.0 | 23 | 70 |

Properties of functional particles

| Examples and Comparative Examples | Micropore surface area ($m^2/g$) | Pore volume (cc/g) | Methylene blue adsorption (%) |
|---|---|---|---|
| Example 7 | 65 | 0.05 | 99 |
| Example 8 | 52 | 0.06 | 99 |
| Example 9 | 49 | 0.03 | 80 |
| Example 10 | 81 | 0.04 | 97 |
| Example 11 | 50 | 0.04 | 99 |
| Comparative Example 2 | 41 | 0.01 | 15 |
| Comparative Example 3 | 5 | 0.27 | 99 |

Properties of functional particles

| Examples and Comparative Examples | Monochlorobenzene dechlorination percentage (%) | Kind of particles |
|---|---|---|
| Example 7 | 99 | II |
| Example 8 | 99 | III |
| Example 9 | 90 | IV |
| Example 10 | V | |
| Example 11 | 99 | VI |
| Comparative Example 2 | 10 | VII |
| Comparative Example 3 | 33 | VIII |

What is claimed is:

1. Porous composite particles comprising 80 to 98% by weight of a filling material and 2 to 20% by weight of carbon, and having an average pore diameter of not more than 5 nm when measured with respect to pores existing in both the surface and inside portions thereof, an average particle size of 1 to 1,000 μm and a specific surface area of 45 to 200 $m^2/g$.

2. Porous composite particles according to claim 1, wherein said filling material is metal oxide particles or metal particles.

3. Porous composite particles according to claim 2, wherein said metal oxide particles are selected from the group consisting of iron-based oxide particles, titanium oxide particles, calcium oxide particles, silicon oxide particles, manganese oxide particles and aluminum oxide particles, and said metal particles are selected from the group consisting of iron particles, nickel particles and magnesium particles.

4. Porous composite particles according to claim 3, wherein said iron-base d oxide particles are iron oxide particles selected from the group consisting of hematite particles, magnetite particles and maghemite particles; particles formed coating with or incorporating elements other than iron onto or into said iron oxide particles; magnetoplumbite-type ferrite particles containing barium, strontium or barium-strontium; or spinel-type ferrite particles containing at least one metal selected from the group consisting of manganese, nickel, zinc, lithium and magnesium.

5. Porous composite particles according to claim 1, wherein the average pore diameter is 1 to 5 nm, the average particle size is 1 to 300 μm and the BET specific surface area is 47 to 180 $m^2/g$.

6. Porous composite particles according to claim 1, which further have a micropore surface area of 45 to 198 $m^2/g$.

7. Porous composite particles according to claim 1, which further have a pore volume of 0.02 to 0.1 cc/g.

8. Porous composite particles according to claim 1, which further have a sphericity of 1.0 to 1.25.

9. Porous composite particles according to claim 1, which further have a methylene blue adsorption of not less than 70% and a monochlorobenzene dechlorination percentage of not less than 70%.

10. A process for producing porous composite particles, comprising:

polymerizing phenols with aldehydes in an aqueous medium in the presence of a filling material using a basic catalyst as an initiator to produce granulated composite particles containing a phenol resin as a binder;

subjecting the obtained reaction mixture to solid-liquid separation to separate said granulated composite particles therefrom;

drying said granulated composite particles to obtain dried composite particles containing a water-soluble phenol resin-forming component in an amount of 0.6 to 5 mg/liter when measured according to the following test method for utensils and toys 3,1,5,3 defined in the Japanese Food Sanitation Law, 10 g of the dried composite particles were dispersed in 100 cc of distilled water, the obtained dispersion was heat-treated at 60° C. for 30 minutes to elute out the water-soluble phenol resin-forming component from the particles, the dispersion was subjected to solid-liquid separation to remove the composite particles therefrom, and the thus obtained elution solution was measured by a calorimetric method using 4-aminoantipyrine to determine an amount of phenol extracted as the amount of the water-soluble phenol resin-forming component, and heat-treating said dried composite particles at a temperature of 400 to 800° C. in an inert atmosphere to carbonize said phenol resin.

11. A process according to claim 10, wherein said filling material is subjected to a lipophilic treatment.

12. A process according to claim 10, wherein the molar ratio of said basic catalyst to said phenols is 0.02:1 to 0.7:1.

13. A process according to claim 10, wherein the drying treatment of said granulated composite particles is conducted at a temperature of 50 to 100° C. under atmospheric pressure.

14. A process according to claim 10, wherein the heat-treating time is 1 to 3 hours.

* * * * *